United States Patent [19]

Lu

[11] Patent Number: 6,055,483
[45] Date of Patent: *Apr. 25, 2000

[54] SYSTEMS AND METHODS USING BRIDGE MODELS TO GLOBALLY OPTIMIZE A PROCESS FACILITY

[75] Inventor: Zhuxin J. Lu, Phoenix, Ariz.

[73] Assignee: Honeywell, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,590

[22] Filed: May 5, 1997

[51] Int. Cl.$^7$ .................................................. G05B 17/00
[52] U.S. Cl. ................................ 702/31; 702/181; 700/3; 700/9; 700/20; 700/28
[58] Field of Search .......................... 364/156, 148–160, 364/468.01–468.15, 132, 138, 164, 165, 148.01, 528.01, 528.1, 528.11, 528.12, 528.24, 528.35; 706/906; 702/31, 113–115, 187, 181–185, 85, 105, FOR 119, FOR 155; 395/500.27–500.29, 500.3; 700/3, 9, 14, 19, 20, 28–31, 47, 48, 52, 306

[56] References Cited

U.S. PATENT DOCUMENTS

| 4,319,320 | 3/1982 | Sato et al. ................................ 364/166 |
|---|---|---|
| 4,736,316 | 4/1988 | Wallman ................................. 364/149 |
| 4,745,758 | 5/1988 | Putman et al. ............................ 60/676 |
| 5,268,835 | 12/1993 | Miyagahi et al. ...................... 364/164 |
| 5,347,446 | 9/1994 | Iino et al. ................................ 364/164 |
| 5,351,184 | 9/1994 | Lu ......................................... 364/165 |
| 5,486,995 | 1/1996 | Krist ...................................... 364/149 |
| 5,566,065 | 10/1996 | Hansen et al. .......................... 364/164 |
| 5,704,011 | 12/1997 | Hansen et al. .......................... 364/164 |

FOREIGN PATENT DOCUMENTS 37 15437 A1  11/1987  Germany ...................... G05B 13/00

*Primary Examiner*—Hal Wachsman
*Attorney, Agent, or Firm*—Hitt Chwang & Gaines

[57] ABSTRACT

A control system and a method of operating the same are introduced that globally optimize associated processes within a process facility. The control system includes a global controller, a bridge predictor and many local controllers. The global controller monitors characteristics of the associated processes and generates, in response thereto, control data for optimizing the process facility. The bridge predictor modifies at least a portion of the control data in response to relationships among the associated processes. The local controllers monitor the associated processes and operate in accordance with the control data to varying degrees to control the monitored associated processes, thereby cooperating with the global controller to optimize the process facility.

33 Claims, 5 Drawing Sheets

SYSTEMS AND METHODS USING BRIDGE MODELS TO GLOBALLY OPTIMIZE A PROCESS FACILITY

CROSS-REFERENCE TO RELATED APPLICATIONS

The present invention is related to that disclosed in (1) U.S. Pat. No. 5,758,047, entitled "Method of Process Controller Optimization in a Multivariable Predictive Controller," and (2) pending U.S. patent application Ser. No. 08/850,288, filed concurrently herewith on May 5, 1997, entitled "Systems and Methods for Globally Optimizing a Process Facility," both applications are commonly assigned to the assignee of the present invention. The disclosures of these related patent applications are incorporated herein by reference for all purposes as if fully set forth herein.

TECHNICAL FIELD OF THE INVENTION

The present invention is directed, in general, to control systems for process facilities and, more specifically, to control systems, and methods of operating such systems, that use bridge predictors to globally optimize a process facility.

BACKGROUND OF THE INVENTION

Presently, process facilities (e.g., a manufacturing plant, a mineral or crude oil refinery, etc.) are managed using distributed control systems. Contemporary control systems include numerous modules tailored to control or monitor various associated processes of the facility. Conventional means link these modules together to produce the distributed nature of the control system. This affords increased performance and a capability to expand or reduce the control system to satisfy changing facility needs.

Process facility management providers, such as HONEYWELL, INC., develop control systems that can be tailored to satisfy wide ranges of process requirements (e.g., global, local or otherwise) and facility types (e.g., manufacturing, refining, etc.). Such providers have two principle objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has certain input (e.g., flow, feed, power, etc.) and output (e.g., temperature, pressure, etc.) characteristics associated with it. In recent years, model predictive control ("MPC") techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 entitled "METHOD OF MULTIVARIABLE PREDICTIVE CONTROL UTILIZING RANGE CONTROL;" U.S. Pat. No. 5,561,599 entitled "METHOD OF INCORPORATING INDEPENDENT FEEDFORWARD CONTROL IN A MULTIVARIABLE PREDICTIVE CONTROLLER;" U.S. Pat. No. 5,572,420 entitled "METHOD OF OPTIMAL CONTROLLER DESIGN OF MULTIVARIABLE PREDICTIVE CONTROL UTILIZING RANGE CONTROL;" and U.S. Pat. No. 5,574,638 entitled "METHOD OF OPTIMAL SCALING OF VARIABLES IN A MULTIVARIABLE PREDICTIVE CONTROLLER UTILIZING RANGE CONTROL," all of which are commonly owned along by the assignee of the present invention and incorporated herein by reference for all purposes (the foregoing issues patents and U.S. Pat. No. 5,758,047, previously incorporated herein by reference, are collectively referred to hereinafter as the "HONEYWELL Patents and Application").

A problem however is that such optimization efforts, when applied to specific processes, are non-cooperative (non-global or non-facility wide) and may, and all too often do, detrimentally impact the efficiency of the process facility as a whole. One approach to resolve this global problem has been to: (1) communicate all pertinent process information from the local controllers to a centralized controller, and (2) establish a "selective" master-slave relationship between the controllers such that: (a) the local controllers continue to locally optimize their respective associated process, and (b) the centralized controller is capable of responding to certain of the pertinent process information to direct particular process(es) to operate at a certain level (e.g., stop, reduced utilization, etc.).

A primary problem with this approach is that it is responsive to emergency situations or extreme circumstances, and as such fails to provide a cooperative (global or facility wide) approach that optimizes not only individual processes, but the facility as a whole. What is needed in the art is a powerful and flexible means for dynamically optimizing a process facility as a whole through a cooperation between a global facility control and the many local (individual or group) process controllers.

SUMMARY OF THE INVENTION

To address the above-discussed deficiencies of the prior art, it is a primary object of the present invention to provide dynamic optimization of an automated process facility as a whole. As described above, a typical process facility includes many associated processes, various ones of which are associated with different stages of the overall process (e.g., natural resource refining, filtration, gas/oil separation, fabrication and other like processes). The present invention achieves global dynamic optimization through techniques that model various relationships among the associated processes, and a dynamic cooperation between a global facility control and many local (individual or group) process controls.

In the attainment of this primary object, the present invention provides a control system and a method of operating the same for controlling associated processes within a process facility. The control system includes a global controller, a bridge predictor and a plurality of local controllers. The global controller monitors characteristics of the associated processes and generates, in response thereto, control data for optimizing the process facility. This controller is "global" because it monitors all, or at least a substantial number, of the associated processes. Monitoring the associated processes may be accomplished directly, indirectly (e.g., through certain local controllers), or through a suitable combination thereof.

The bridge predictor modifies at least a portion of the control data in response to relationships among the associated processes. For the purposes of the present invention, the bridge predictor may use any suitable model or modeling technique (e.g., mathematic, logic or other state estimator) to modify the control data—the model or modeling technique may be used to understand, estimate or predict the relationships (e.g., association, behavior, function, operation, performance, relation, etc.) among the associated processes.

The local controllers monitor the associated processes and operate in accordance with the control data to varying degrees to control the monitored associated processes, thereby cooperating with the global controller and, in part, the bridge predictor to optimize the process facility. These controllers are "local" because each is associated with a specific one or group of associated processes, regardless of the actual physical location of the local controllers with respect to the associated processes.

According to an advantageous embodiment of the present invention, the bridge predictor predicts each of a current (time $t_0$) value and a future (time $t_x$) value of the portion of the control data. A comparison controller compares an actual (time $t_0$) value of the portion of the control data and the current and future values of the portion. The bridge predictor, which is associated with the comparison controller, modifies the portion of the control data in response thereto to further optimize the process facility. In a related embodiment, the control system modifies the bridge predictor in response to the comparison, such dynamic modifications work to improve an efficiency of the bridge predictor, and to further optimize the process facility.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
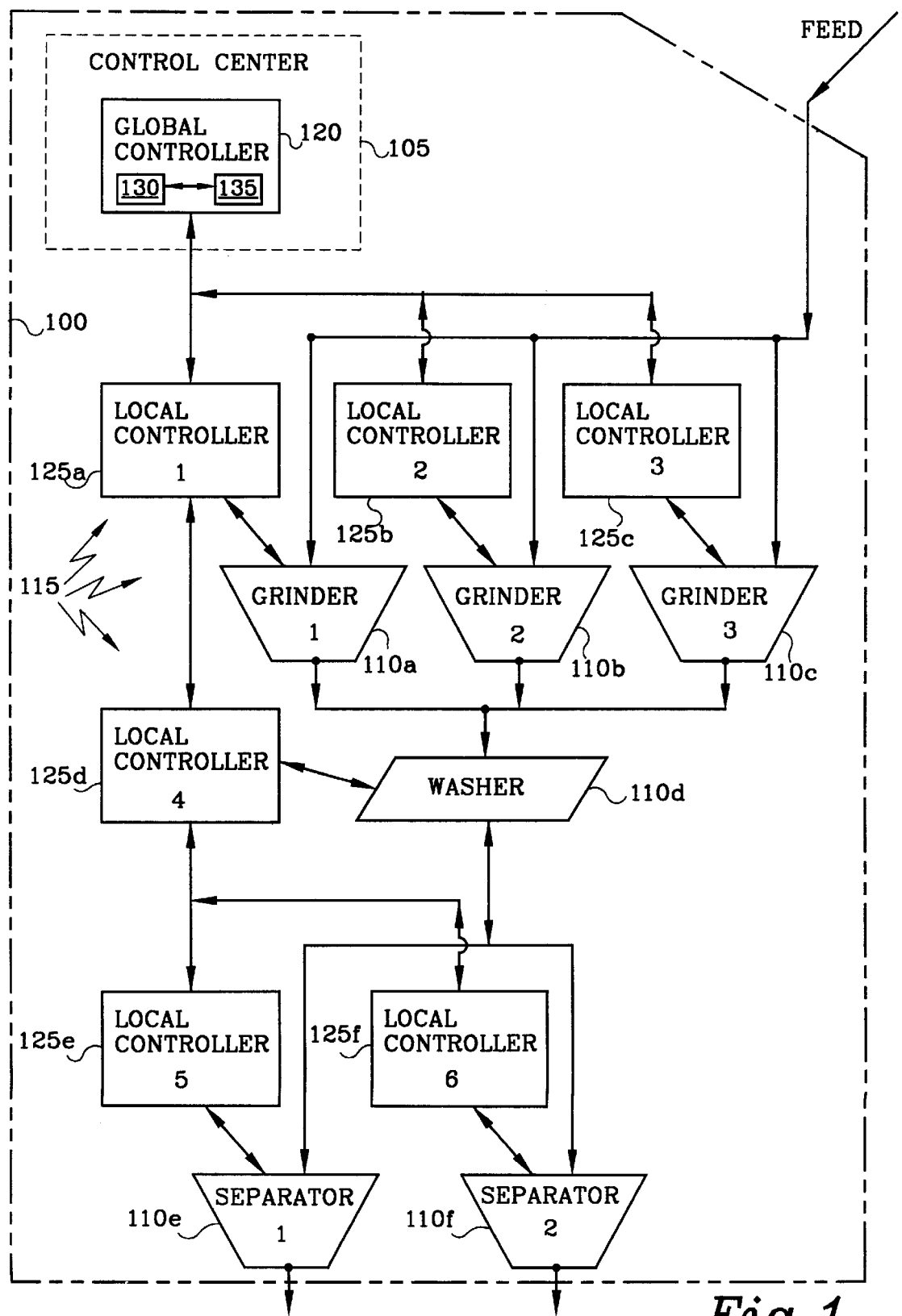
FIG. 1 illustrates a simple block diagram of a process facility with which a control system according to the principles of the present invention may be used.

Referring initially to FIG. 1, illustrated is a simple block diagram of a process facility 100. Exemplary process facility 100 operates to process raw materials, and includes a control center 105, six associated processes 110a to 110f that are arranged in three stages and a control system (generally designated 115). The term "include," as used herein, means inclusion without limitation. It should be noted that FIG. 1 (as well as FIGS. 2 to 5, discussed hereinbelow) and the various embodiments used to describe the principles of the present invention in this patent document are illustrative only. Those skilled in the art will understand that such principles may be implemented and used to globally optimize any suitably arranged process facility.

Exemplary control center 105 illustrates a central area that is commonly operator manned (not shown) for monitoring and controlling the three exemplary process stages. A first process stage includes three raw material grinders 110a to 110c that operate to receive a "feed" of raw material core and grind the same, such as using a pulverizer or grinding wheel, into smaller particles of raw material. The term "or," as used herein, is inclusive, meaning and/or. The second process stage includes a washer 110d that operates to receive the ground raw materials and clean the same to remove residue from the first stage. The third process stage includes a pair of separators 110e and 110f that operate to receive the ground and washed raw materials and separate the same, such as into desired minerals and any remaining raw materials. Since this process facility is provided for purposes of illustration only and the principles of such a facility are well known, further discussion of the same is beyond the scope of this patent document and unnecessary.

Exemplary control system 115 illustratively includes a global controller 120 and six local controllers 125a to 125f, each of which is implemented in software and executable by a suitable conventional computing system (standalone or network), such as any of HONEYWELL, INC.'s AM K2LCN, AM K4LCN, AM HMPU, AxM or like systems. Exemplary global controller 120 illustratively includes a bridge predictor 130, that in alternate embodiments may of course be separately implemented or, for that matter, suitably associated with control system 115 in any appropriate arrangement. The phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like.

Those skilled in the art will understand that"controllers" and the above-identified bridge predictor may be implemented in hardware, software, or firmware, or some suitable combination of the same; in general, the use of computing systems in control systems for process facilities is well known.

Global controller 120 is associated with each of local controllers 125 and bridge predictor 130, directly or indirectly, to allow communication of information therebetween. Global controller 120 monitors characteristics (e.g., status, temperature, utilization, efficiency, cost and other economic factors, etc.) of associated processes 110, either directly or indirectly (as shown, through local controllers 125 associated with processes 110). Depending upon the implementation, such monitoring may be of an individual process, group of processes, the facility as a whole, or otherwise. Global controller 120 generates, in response thereto, control data, at least a portion of which may be modified by bridge predictor 130. The phrase "control data," as used herein, is defined as any numeric, qualitative or other value generated by global controller 120 to globally control (e.g., direct, manage, modify, recommend to, regulate, suggest to, supervise, cooperate, etc.) a particular process, a group of processes, a facility, a process stage, a group of stages, a sequence of processes or stages, or the like to optimize the facility as a whole—in a preferred embodiment, the control data is dynamically generated and is based at least upon a given facility's efficiency, production or economic cost, and most preferably all three.

Exemplary bridge predictor 130 is associated with a comparison controller 135 and operates to selectively modify at least a portion of the control data in response to relationships among associated processes 110. As stated hereinabove, bridge predictor 130 may use any suitable model or modeling technique to modify at least some portion of the control data. Further, such modifications may be responsive to (e.g., a function of) the tangible (physical) or intangible (logical) relationships among associated processes 110.

Most preferably, bridge predictor 130 predicts each of a current (time $t_0$) value and a future (time $t_x$) value of the portion of the control data. Exemplary comparison controller 135 compares a current actual (time $t_0$) value of the portion of the control data and the current and future values of the portion. The bridge predictor, which is associated with the comparison controller, modifies the portion of the control data in response thereto, to thereby further optimize the process facility. In the event that control system 115, or some portion thereof, notices consistent "mis-predictions" by bridge predictor 130, control system 115 may suitably dynamically modify bridge predictor 130 in response to the comparison, such dynamic modifications working to improve an efficiency of bridge predictor 130, and to further optimize process facility 100.

The control data is then communicated to local controllers 125. Local controllers 125, which are also monitoring associated processes 110, operate to varying degrees in accordance with the control data to control the associated processes, and, more particularly, to modify one or more processes 110 and improve the monitored characteristics and facility 100 as a whole. The present invention enables both global and local monitoring, and cooperative control of associated processes 110 using these varying degrees of compliance with the control data. As will be described in greater detail hereinbelow, the varying degrees of compliance by local controllers 125 may range between full compliance and noncompliance. As is described in pending U.S. patent application Ser. No. 08/850,288 (the "'288 Application"), previously incorporated herein by reference, the relationship between global controller 120 and various ones of local controllers 110 may be master-slave (full compliance), cooperative (varying compliance, such as using the control data as a factor in controlling the associated processes), complete disregard (noncompliance) or otherwise.

As will become clearer hereinafter, an important aspect of the present invention is that one or more specific processes 110, and facility 100 as a whole, may be dynamically and cooperatively controlled as a function of local and global optimization efforts, and such dynamic and cooperative control is independent of the relationship between global controller 120 and specific local controllers 125, as described hereinabove. Depending upon the implementation and needs of a given facility, the relationship between global controller 120 and specific local controllers 125 may be static (i.e., always only one of compliance, cooperative, or noncompliance), dynamic (i.e., varying over time, such as within a range between compliance and noncompliance, some lesser range therebetween, or otherwise), or varying therebetween.

Figure 2:
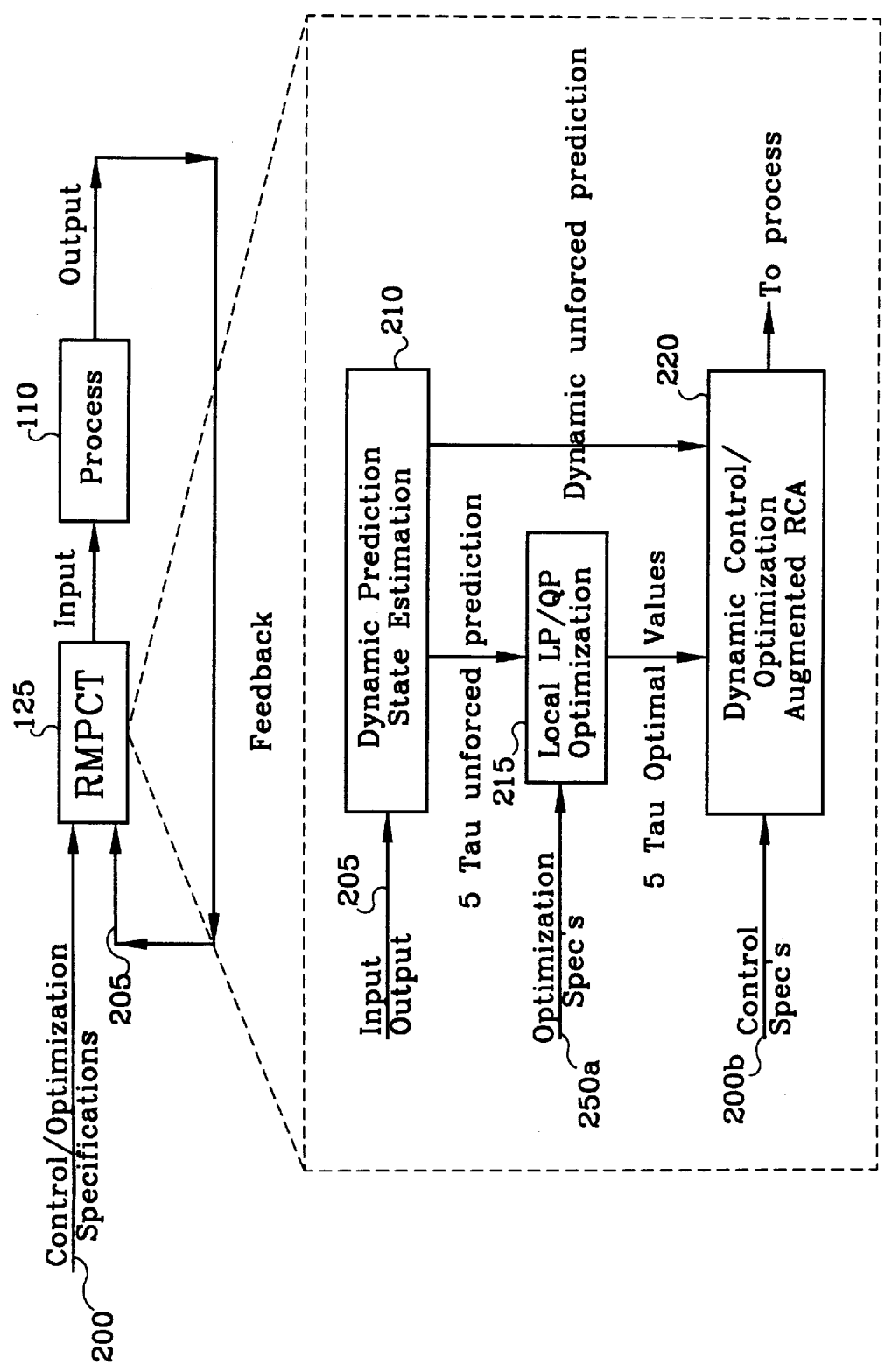
FIG. 2 illustrates a block diagram of an exemplary local controller that may be suitably associated with an associated process.

Turning now to FIG. 2, illustrated is a block diagram of an exemplary local controller 125 associated with a particular one or group of associated processes 110. Local controller 125 is a RMPC (robust multi-variable predictive control) structure developed by HONEYWELL, INC., the function of which is the subject of and described in detail in the HONEYWELL Patents and Application, all of which were previously incorporated hereinabove by reference as if fully set forth in this patent document. As such, the present description only introduces certain relative features of local controller 125.

According to the illustrated embodiment, local controller 125 receives as inputs, control/optimization specifications 200 (e.g., bounds, ranges, tolerances, control points, etc.) and feedback data 205 (e.g., output of associated process 110). Control/optimization specifications 200 may be received from any of a number of sources depending upon the associated process or group of associated processes 110, facility 100 or other factor. For example, any of control/optimization specifications 200 may be received from an operator of control center 105, retrieved from a database or data repository, received from other local controllers 125 or global controller 120, etc.

Control/optimization specifications 200 include two types of variables: (1) a first variable ("MV") that may be manipulated, such as flow, feed, air blower, etc; and (2) a second variable ("DV") that cannot be manipulated and is a disturbance variable, such as burn rate, fuel quality per unit, etc. Feedback data 205 is a third variable ("CV") that is responsive to MVs and DVs, and is an output of associated process 110, such as pressure, temperature, etc. Any or all of such MVs, DVs and CVs represent characteristics of associated process 110 that may be suitably monitored by local controller 125 and, directly or indirectly, by global controller 120.

Local controller 125 includes a dynamic prediction task with state estimation 210, a local linear program/quadratic program ("LP/QP") optimization task 215 and a dynamic control/optimization augmented range control algorithm ("RCA") 220. Exemplary dynamic prediction task 210 receives CVs and operates to generate an array of multiple predictions (or dynamic unforced predictions) and, at 5 tau (response time close to end), an unforced prediction for values associated with associated process 110. Exemplary local LP/QP optimization task 215 receives optimization specifications 200a and, in response to the unforced prediction, operates to generate, at 5 tau, optimal values associated with associated process 110. Most preferably, optimization specifications 200a are associated, directly or indirectly, with an economic value of the output of associated process 110. Exemplary dynamic control/optimization augmented RCA 220 receives control specifications 200b and, in response to receiving the array of multiple predictions (from dynamic prediction task 210) and the optimal values (from local LP/QP optimization task 215), operates to generate control values that are input to associated process 110.

It should be noted that an important aspect of exemplary local controller 125 is the use of control/optimization specifications 200 and feedback data 205 to locally unify economic/operational optimization with MPC (model predictive control) dynamically for a specific process or group of processes.

Figure 3:
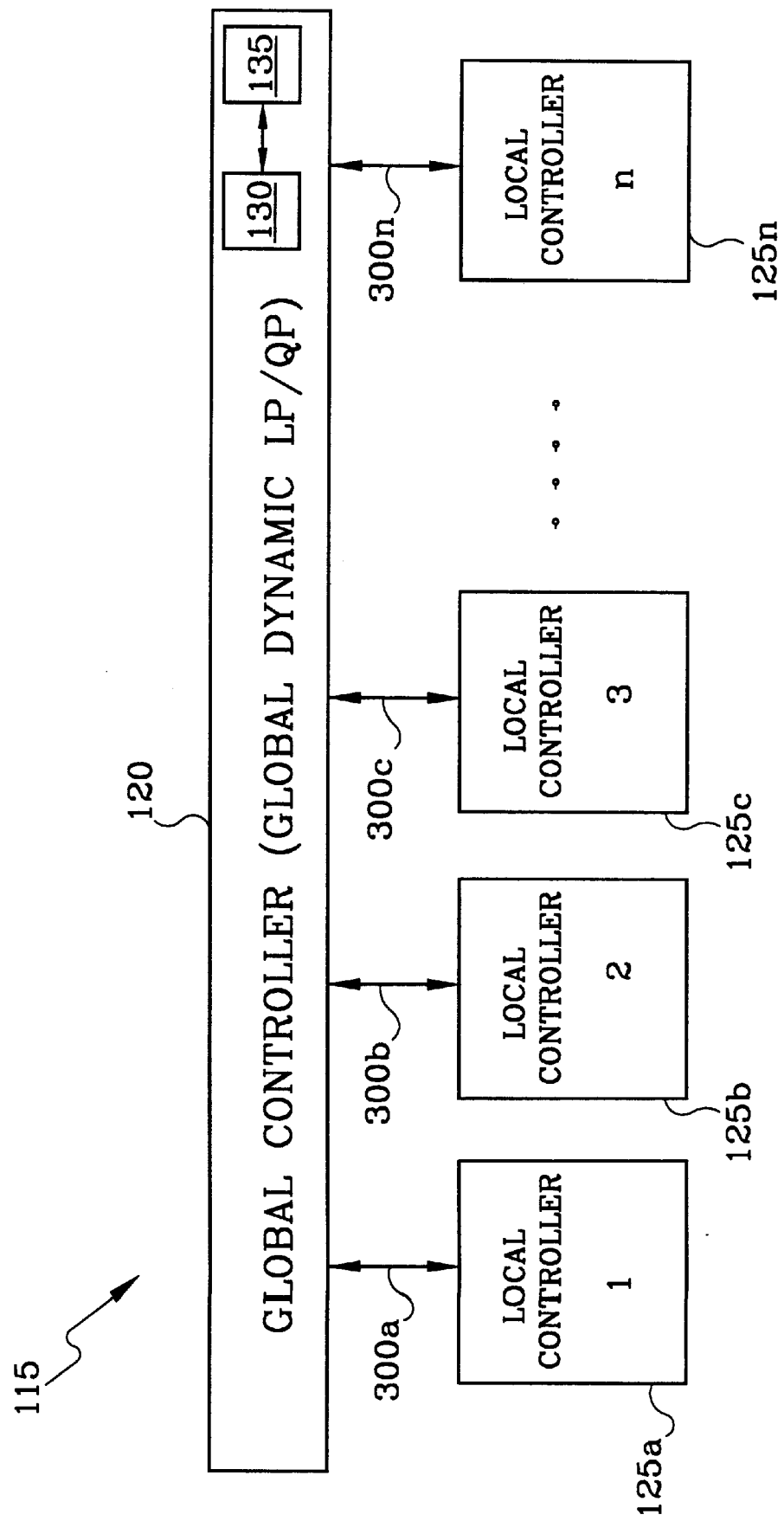
FIG. 3 illustrates a block diagram of exemplary control system that includes a global controller, a bridge predictor and a plurality of local controllers in accordance with the principles of the present invention.

Turning now to FIG. 3, illustrated is a block diagram of exemplary control system 115 that includes global controller 120 (dynamic linear program/quadratic program ("DLP/

QP")), a plurality of local controllers 125a to 125n (e.g., RMPC structure of FIG. 2), bridge predictor 130 and comparison controller 135, all in accordance with the principles of the present invention. It should be assumed that local controllers 125a to 125n are associated with associated processes 110 of FIG. 1 (not shown).

An important aspect or feature of the relationship between controllers 120, 125, 135 and bridge predictor 130 is a constant, preferably dynamic, communication of control data and characteristics of associated processes 110 therebetween via conventional communication paths 300a to 300n (synchronous or asynchronous). As introduced hereinabove, exemplary process facility 100 includes three process stages—grinding, washing and separating—that cooperate to process raw materials. These three stages are interrelated and, according to the illustrated embodiment, cascaded (of a series of processes suitably arranged so that the output of at least one feeds into the input of at least another—at least one series of two or more process or sub-process steps). Using the notion of MVs, DVs and CVs introduced hereinabove, and referring concurrently to FIG. 1, cascading of the illustrated process may be described as follows:

(1) MVs and DVs associated with the grinding processes (grinders 110a to 110c) are input to any of the grinding processes;

(2) any of the MVs and DVs input to any of the grinding processes (grinders 110a to 110c), and any resulting CVs thereof, may be input as DVs, along with any MVs and DVs associated with the washing process (washer 110d), into the washing process; and (3) any of the MVs and DVs input to any of the grinding processes (grinders 110a to 110c), and any resulting CVs thereof, and any of the MVs and DVs input to the washing process (washer 110d), and any resulting CVs thereof, may be input as DVs, along with the MVs and DVs input to the separating processes (separators 110e to 110f), into either of the separating processes.

A broad problem with the foregoing is that while the MVs and DVs that were generated for use with grinding processes 110a to 110c may be less accurate when cascaded into washing or separating processes 110d to 110f—for example, such variables may become untimely, such as a stale prediction. An important aspect of the present invention is the use of bridge predictor 130 to modify one or more of these variables in response to the various relationships among such associated processes 110.

Figure 4:
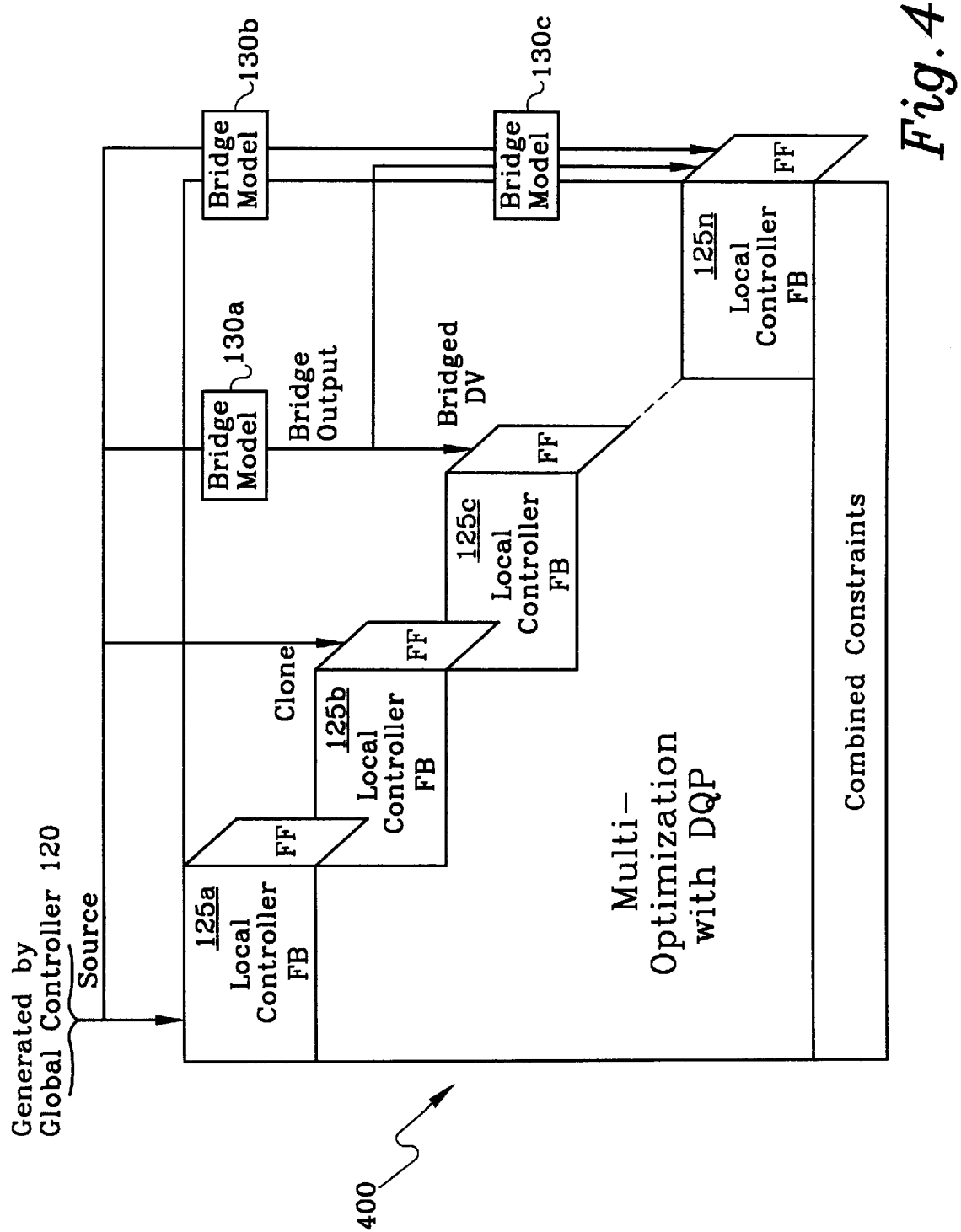
FIG. 4 illustrates a block diagram that represents one advantageous association of the bridge predictor and several local controllers in accordance with the principles of the present invention.

Turning next to FIG. 4, illustrated is a block diagram (generally designated 400) that represents one advantageous association of bridge predictor 130 (illustratively shown as three associated sub-controllers, namely, bridge models 130a to 130c) and several local controllers 125a to 125n according to the principles of the present invention. Each off-block diagonal controller 125 is implemented with a corresponding feedforward ("FF") dynamic model. MV or DV (control data) may be suitably linked to some other DV, the former being referred to as a "source" and the latter as a "clone."

Certain off-block diagonal controllers 125 may suitably pass data through a bridge model 130 (note that instead of being cascaded, as illustrated, the same may alternatively be merged or added), predicted values thereof may be used to modify at least a portion of the control data, and the control data is then communicated to local controllers 125 (RMPCTs). It should be noted that any combined constraint may be a linear function of MVs and DVs without feedback ("FB," measurement), although alternate arrangements may be suitably implemented, as those skilled in the art know.

Figure 5:
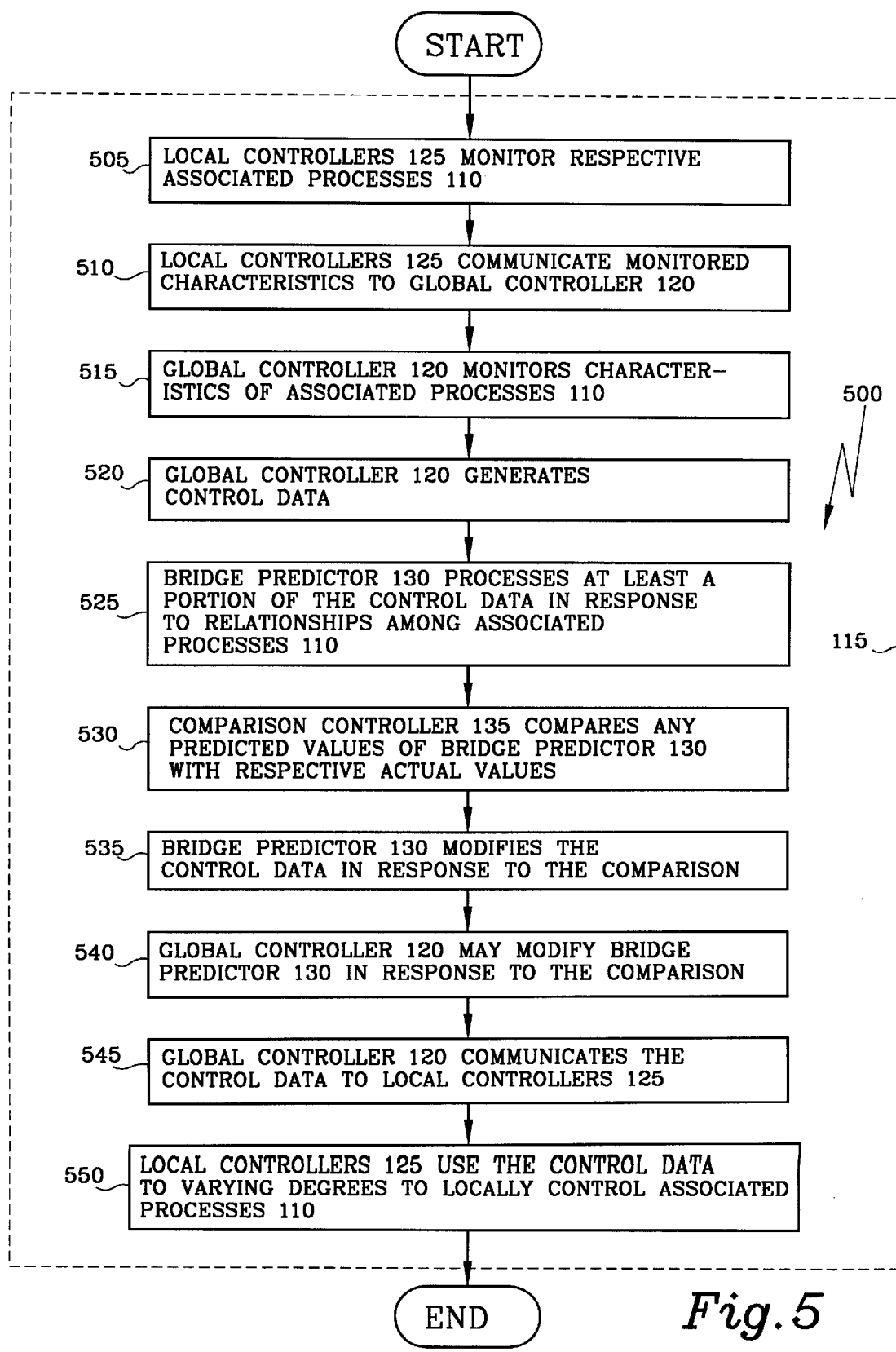
FIG. 5 illustrates a flow diagram of an exemplary method of operating the control system of FIGS. 1 and 3 to globally optimize a process facility in accordance with the principles of the present invention.

Turning to FIG. 5, illustrated is a flow diagram of an exemplary method (generally designated 500) of operating control system 115 to globally optimize a process facility in accordance with the principles of the present invention. For the purposes of illustration, concurrent reference is made to FIGS. 3 and 4. To begin, each of local controllers 125 continuously monitors respective associated processes 110, process step 505, and particularly, characteristics of associated processes 110, such as output and other measurable data incident thereto, including pressure, temperature, or the like (e.g., CVs).

Local controllers 125 communicate such monitored characteristics to global controller 120, input/output step 510. Global controller 120 consequently globally monitors associated processes 110 by indirectly monitoring characteristics of associated processes 110 through local controllers 125, process step 515. Of course, in alternate embodiments, global controller 120 may suitably globally monitor associated processes 110 directly.

According to the illustrated embodiment, global controller 120 has an economic objective function (J) that is equal, at 5 Tau, to a summation of dynamic LP/QP coefficients (linear/quadratic objective functions) of local controllers 125, such that:

$$J = LP/QP1 + LP/QP2 + LP/QP3 + \ldots + LP/QPn$$

Each local controller 125 preferably updates its CV predictions and constraints according to the embodiment of FIG. 2, and communicates model information (e.g., on-the-fly model updates), dynamic predictions, current CV, MV, DV values, status and constraints, objective functions, etc.

Global controller 120 generates, in response to such monitored characteristics, control data for dynamically optimizing the process facility, process step 520. Global controller 120 combines the multiple dynamically received LP/QP coefficients as set forth above to solve for a global LP/QP (control data according to the illustrated embodiment). Thus, exemplary global controller 120 uses an economic-based optimization parameter, although in alternate embodiments, any suitable at least substantially global (facility-wide) optimization algorithm, procedure, equation or the like may be used.

At least a portion of the control data is communicated to bridge predictor 130 (exemplary bridge models 130a to 130c) where it is processed in response to certain relationships among two or more of associated processes 110 to predict values of certain characteristics of associated processes 110, process step 525. Most preferably, bridge predictor 130 predicts each of a current (time $t_0$) value and a future (time $t_x$) value for the portion of the control data as the same relates to associated processes 110. In an advantageous embodiment, bridge predictor 130 further provides enough points between the current and future values to supply a predicted slope or trend of a given process or group of processes with respect to the portion of the control data (an array pf predicted values).

Comparison controller 135 compares those portions of the control data that represent the predicted values of characteristics of associated processes 110 with their respective actual (current real) values, monitored by local controllers 125 (process step 405) according to the illustrated embodiment, process 530. Most preferably, comparison controller 135 compares an actual (time $t_0$) value of the portion of the control data and the current and future values of the portion predicted by bridge predictor 130. Bridge predictor 130 may modify the portion of the control data in response thereto to further optimize the process facility, process step 535.

Global controller 125 may modify bridge predictor 130 in response to the comparison (comparison controller 135 determined an efficiency (productivity, cost, capability, worth, profit, etc.) of at least a portion of bridge predictor 130 (or bridge models 130*a* to 130*b*)), such dynamic modifications working to improve an efficiency of bridge predictor 130, and to further optimize process facility 100, process step 540. For example, global controller 120, or some other part of control system 115, may track a performance characteristic of bridge predictor 130 (or bridge models 130*a* to 130*c*) and compare the same with some threshold or the like. In the event that the performance characteristic compares unfavorably therewith, then bridge predictor 130, or some poorly performing part thereof (e.g., bridge models 130*a*, 130*b* or 130*c*), may be suitably dynamically modified to improve its performance.

It should again be noted that bridge predictor 130 may use any of bridge models 130*a* to 130*c* or, alternatively, any other suitable model or modeling technique to modify (understand or predict association, behavior, function, operation, performance, or the like among associated processes 110) the control data.

Global controller 120 communicates the control data to local controllers 125, input/output step 545. Local controllers 125 use the control data, to varying degrees, to locally control associated processes 110 to optimize process facility 100, process step 550. The optimization solution is thus integrated into each local controller (RMPCT control solution) 125.

An important aspect of above-described steps is that the control data provides a dynamically updated global steady state optimization solution for process facility 100. This global solution is used, to varying degrees, by local controllers 125 to optimize associated processes 110 in response to a desired facility-wide optimization solution, which may be largely economic-based. Recall, as set forth hereinabove, such varying degrees of compliance with the control data may suitably range between compliance and noncompliance with the same. Local controllers 125 may dynamically vary their respective degree (range) of compliance. According to the illustrated embodiment, a particular local controller 125 may have a cooperative association, a direct association, or "Pro-Only" (on your own) association with the control data. These are described in greater detail in the '288 Application.

In alternate embodiments, multiple local controllers 125 may have various static degrees of compliance, or in some combination of the same. In addition, it should again be noted that global controller 120 is termed "global" because it monitors all, or at least a substantial number, of associated processes 110, which may be accomplished directly, indirectly, or through a suitable combination thereof. Those skilled in the art should understand that although the functions of global controller 120 have been illustrated as being centralized in the illustrated embodiments hereof, such functionality may be suitably distributed throughout process facility 100. Similarly, local controllers 125 are termed "local" because each is associated with a specific one or group of associated processes 110, and this is regardless of the physical location or proximity of the local controllers with respect to associated processes 110. Those skilled in the art should therefore also understand that although the functions of local controllers 125 have been illustrated as being distributed in the illustrated embodiments hereof, such functionality may be suitably centralized somewhere in process facility 100. The functionality of controllers 120 and 125 may be suitably collectively distributed or centralized, or partially distributed and centralized, all depending upon the needs of the process facility to be controlled. It should also be noted that the use of modeling techniques to improve the cooperation between global controller 120 and local controllers 125 may be of any suitable type (any bridge predictor 130 that modifies at least a portion of the control data in response to relationships among the associated processes) and therefore may be distributed, localized, centralized or otherwise suitably implemented.

Although the present invention and its advantages have been described in detail, those skilled in the art should understand that they can make various changes, substitutions and alterations herein without departing from the spirit and scope of the invention in its broadest form.

What is claimed is:

1. A control system for controlling associated processes within a process facility, comprising:

a global controller that monitors said associated processes and generates, in response thereto, control data for optimizing said process facility;

a bridge predictor using a time-based prediction optimizer that is capable of modifying at least a portion of said control data in response to relationships among said associated processes; and local controllers that operate in accordance with said control data to varying degrees to control said associated processes, cooperate with said global controller to optimize said process facility and modify said time-based prediction optimizer to correct mis-predictions thereby.

2. The control system as recited in claim 1 wherein said bridge predictor is associated with said global controller.

3. The control system recited in claim 1 wherein said local controllers monitor said associated processes.

4. The control system recited in claim 1 wherein said local controllers monitor characteristics of said associated processes and said modified portion represents a predicted value of said monitored characteristics.

5. The control system recited in claim 4 further comprising a comparison controller that compares said monitored characteristics and said modified portion.

6. The control system recited in claim 1 wherein said global controller generates said control data as a function of an economic optimization parameter.

7. The control system recited in claim 1 wherein said global controller monitors characteristics of said associated processes and said monitored characteristics are communicated between said global controller and said local controllers.

8. The control system recited in claim 7 wherein said monitored characteristics include output data of said associated processes.

9. The control system recited in claim 1 wherein said varying degrees of said local controllers range between compliance and noncompliance with said control data.

10. The control system recited in claim 1 wherein a particular local controller has a degree of compliance.

11. The control system recited in claim 1 wherein said global controller is centralized.

12. The control system recited in claim 1 wherein ones of said local controllers are proximate ones of said associated processes.

13. A method of operating a control system for controlling associated processes within a process facility, comprising the steps of:

globally monitoring said associated processes and generating, in response thereto, control data for optimizing said process facility;

modifying at least a portion of said control data using a time-based prediction optimizer in response to relationships among said associated processes;

locally controlling said associated processes, to varying degrees, in accordance with said control data to optimize said process facility; and modifying said time-based prediction optimizer to correct mis-predictions thereby.

14. The method of operation recited in claim 13 further comprising the step of locally monitoring said associated processes.

15. The method of operation recited in claim 13 further comprising the step of monitoring characteristics of said associated processes, said modified portion representing a predicted value of said monitored characteristics.

16. The method of operation recited in claim 15 further comprising the step of comparing said monitored characteristics and said modified portion.

17. The method of operation recited in claim 13 wherein said generating step comprises the step of using an economic optimization parameter.

18. The method of operation recited in claim 13 wherein said globally monitoring step comprises the steps of:

monitoring characteristics of said associated processes; and communicating said monitored characteristics between a global controller and local controllers of said associated processes.

19. The method of operation recited in claim 18 wherein said monitored characteristics include output data of said associated processes.

20. The method of operation recited in claim 13 wherein said varying degrees range between compliance and noncompliance with said control data.

21. The method of operation recited in claim 13 further comprising the step of using a particular local controller to control a particular one of said associated processes, said particular local controller complying with said control data.

22. The method of operation recited in claim 13 wherein said step of globally monitoring is centralized within said control system, and said step of locally controlling is distributed within said control system.

23. A control system for controlling associated processes within a process facility, comprising:

a global controller that monitors characteristics of said associated processes and generates, in response thereto, control data for optimizing said process facility;

a bridge predictor using a time-based prediction optimizer that is capable of modifying at least a portion of said control data in response to relationships among said associated processes; and local controllers that monitor said associated processes, operate in accordance with said control data to varying degrees to control said monitored associated processes, cooperate with said global controller to optimize said process facility and modify said time-based prediction optimizer to correct mis-predictions thereby.

24. The control system recited in claim 23 wherein said bridge predictor is associated with said global controller.

25. The control system recited in claim 23 wherein said local controllers monitor characteristics of said associated processes and said modified portion represents a predicted value of said monitored characteristics.

26. The control system recited in claim 25 further comprising a comparison controller that compares said monitored characteristics and said modified portion.

27. The control system recited in claim 23 wherein said global controller generates said control data as a function of an economic optimization parameter.

28. The control system recited in claim 23 wherein said monitored characteristics are communicated between said global controller and said local controllers.

29. The control system recited in claim 23 wherein said monitored characteristics include output data of said associated processes.

30. The control system recited in claim 23 wherein said varying degrees of said local controllers range between compliance and noncompliance with said control data.

31. The control system recited in claim 23 wherein a particular local controller has a degree of compliance.

32. The control system recited in claim 23 wherein said local controllers are distributed.

33. The control system recited in claim 23 wherein ones of said local controllers are proximate ones of said associated processes.

* * * * *